US012750289B2

(12) United States Patent
Narotamo et al.

(10) Patent No.: US 12,750,289 B2
(45) Date of Patent: Sep. 29, 2026

(54) INTENT DETECTION VIA MASKED MODELS

(71) Applicant: Zendesk, Inc., San Francisco, CA (US)

(72) Inventors: Nichal Ashok Narotamo, Lisbon (PT); David Oliveira Aparício, Oporto (PT); Mariana Sá Correia Leite de Almeida, Lisbon (PT); Inês Jorge Pedro, Berlin (DE)

(73) Assignee: Zendesk, Inc., San Francisco, CA (US)

( * ) Notice: Subject to any disclaimer, the term of this patent is extended or adjusted under 35 U.S.C. 154(b) by 0 days.

(21) Appl. No.: 18/679,310

(22) Filed: May 30, 2024

(65) Prior Publication Data

US 2025/0023802 A1 Jan. 16, 2025

Related U.S. Application Data

(60) Provisional application No. 63/526,659, filed on Jul. 13, 2023.

(51) Int. Cl.
*H04L 41/507* (2022.01)
*H04L 41/5025* (2022.01)

(52) U.S. Cl.
CPC ........ *H04L 41/5025* (2013.01); *H04L 41/507* (2013.01)

(58) Field of Classification Search
CPC ........ G06Q 30/16; G06Q 30/00; G06Q 30/02; G06Q 30/08; G06Q 10/04; G06N 3/08; G06N 20/00; G06F 18/24; G06F 16/9535; G06F 40/40; H04L 41/507; H04L 41/5025
See application file for complete search history.

(56) References Cited

U.S. PATENT DOCUMENTS

| | | | | |
|---|---|---|---|---|
| 10,824,818 | B2 | 11/2020 | Peper et al. | |
| 11,336,539 | B2 | 5/2022 | Rath | |
| 11,514,245 | B2 | 11/2022 | Li et al. | |
| 2013/0282430 | A1 | 10/2013 | Kannan et al. | |
| 2015/0010134 | A1 | 1/2015 | Erel et al. | |
| 2020/0097980 | A1 | 3/2020 | Teo et al. | |
| 2021/0224818 | A1 | 7/2021 | Choudhary et al. | |
| 2021/0264438 | A1 * | 8/2021 | Singh | G06Q 30/016 |
| 2021/0328888 | A1 * | 10/2021 | Rath | H04L 41/5074 |

(Continued)

OTHER PUBLICATIONS

Wei, Bencheng. "Effective user intent mining with unsupervised word representation models and topic modelling." arXiv preprint arXiv:2109.01765 (2021).*

(Continued)

*Primary Examiner* — Sarah M Monfeldt
*Assistant Examiner* — Donald J Edmonds
(74) *Attorney, Agent, or Firm* — Dinsmore & Shohl LLP

(57) ABSTRACT

The present disclosure relates to predicting an intent associated with a support ticket. In one example, a method for predicting intents includes providing, as inputs to an intent model: the support ticket; and a set of one or more relevant intents associated with an organization associated with the support ticket, wherein the set of one or more relevant intents is a subset of a set of possible intents the intent model is configured to predict; and receiving, as output from the intent model, one or more predicted intents associated with the support ticket, wherein the one or more predicted intents are in the set of one or more relevant intents associated with the organization.

15 Claims, 9 Drawing Sheets

(56) References Cited

U.S. PATENT DOCUMENTS

| | | | | |
|---|---|---|---|---|
| 2021/0350209 | A1* | 11/2021 | Wang | G06N 3/08 |
| 2022/0230000 | A1 | 7/2022 | Jalaluddin et al. | |
| 2022/0414344 | A1 | 12/2022 | Makki Niri et al. | |
| 2023/0044981 | A1* | 2/2023 | Li | G06F 18/24 |
| 2023/0104583 | A1 | 4/2023 | Bekker et al. | |
| 2023/0197064 | A1 | 6/2023 | Bekker et al. | |

OTHER PUBLICATIONS

International Search Report for International Application No. PCT/US2024/034087, dated Oct. 8, 2024, in 3 pages.

Written Opinion of the International Searching Authority for International Application No. PCT/US2024/034087, dated Oct. 8, 2024, in 4 pages.

* cited by examiner

INTENT DETECTION VIA MASKED MODELS

CROSS-REFERENCE TO RELATED APPLICATIONS

This Application claims the benefit of and priority to U.S. Provisional Patent Application No. 63/526,659, filed on Jul. 13, 2023, the entire contents of which are hereby incorporated by reference.

BACKGROUND

Field

Aspects of the present disclosure relate to intent detection using machine learning models.

Description of Related Art

Numerous types of organizations offer end user support in which, for example, an end user has an issue or a request and reports it to a support service of the organization using a communication channel, such as email or chat. These end user requests (sometimes referred to as "support tickets") can relate to myriad issues, such as help with a login, obtaining information regarding an order, deleting an account, etc. Automatically categorizing support tickets into particular end user "intents" helps an organization direct an end user to the best support asset (e.g., an agent specifically trained to address the end user's issues).

Knowing the industry of an organization is helpful to determine intents relevant to that organization's end users, and relatedly to filter out invalid intents. For example, an end user of a mobile banking application is not likely to request help with "updating an order" (an intent). However, knowing the industry of an organization might not be enough to filter out invalid intents since, for example, an organization serving the end user might not offer all services that are typically found in its given industry, or the organization serving the end user might operate across industries.

Various techniques exist for the problem of intent detection. A first technique is to train a single, generic model that receives all support tickets from all organizations to predict one or more intents associated with each support ticket from a list (or taxonomy) of possible intents. This technique has the advantage of simplicity, since only a single model needs to be trained, deployed, and maintained. However, this technique has the technical shortcoming of not restricting possible intents, and thus models trained according to this technique may routinely predict an intent that is not valid for a given end user (e.g., predicting an "update order" intent for the end user of the mobile banking application). Outputting invalid intents is a technical problem with many negative effects, such as routing end users to the wrong support assets, which reduces confidence in end users and support agents alike.

A second technique is to train organization-specific models and to process support tickets of a particular organization with that particular organization's specific model. This technique has the advantage of outputting intents that are relevant to the organization's end users because the organization chooses its own set of relevant intents. However, this technique creates a technical problem in that many models need to be trained, deployed, and maintained, which involves significant use of physical and financial resources.

A third technique is to train industry-specific models and to process support tickets of a particular organization with an industry-specific model associated with that particular organization. This technique has the advantages of reducing the number of necessary models (since, generally, each industry includes many organizations) and of outputting intents that are valid for that industry. However, this technique still has the issue of requiring multiple models, and further requires an accurate assignment of organizations to industries. In many cases, organizations do not "fit" perfectly into any one industry.

Accordingly, there is a need for improved techniques for performing intent detection using machine learning models.

SUMMARY

One aspect provides a method of predicting an intent associated with a support ticket, comprising: providing, as inputs to a masked intent model: the support ticket; and a set of one or more relevant intents associated with an organization associated with the support ticket, wherein the set of one or more relevant intents is a subset of a set of possible intents the masked intent model is configured to predict; and receiving, as output from the masked intent model, one or more predicted intents associated with the support ticket, wherein the one or more predicted intents are in the set of one or more relevant intents associated with the organization.

Another aspect provides a method of predicting an intent associated with a support ticket, comprising: processing, with a masked intent module, the support ticket, wherein the masked intent module is configured to mask a subset of intents from a set of predictable intents and to only predict unmasked intents from the set of predictable intents; and providing, as output from the masked intent module, one or more predicted intents associated with the support ticket, wherein the one or more predicted intents are one or more unmasked intents from the set of predictable intents.

Other aspects provide processing systems configured to perform the aforementioned methods as well as those described herein; non-transitory, computer-readable media comprising instructions that, when executed by one or more processors of one or more processing systems, cause the one or more processing systems to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
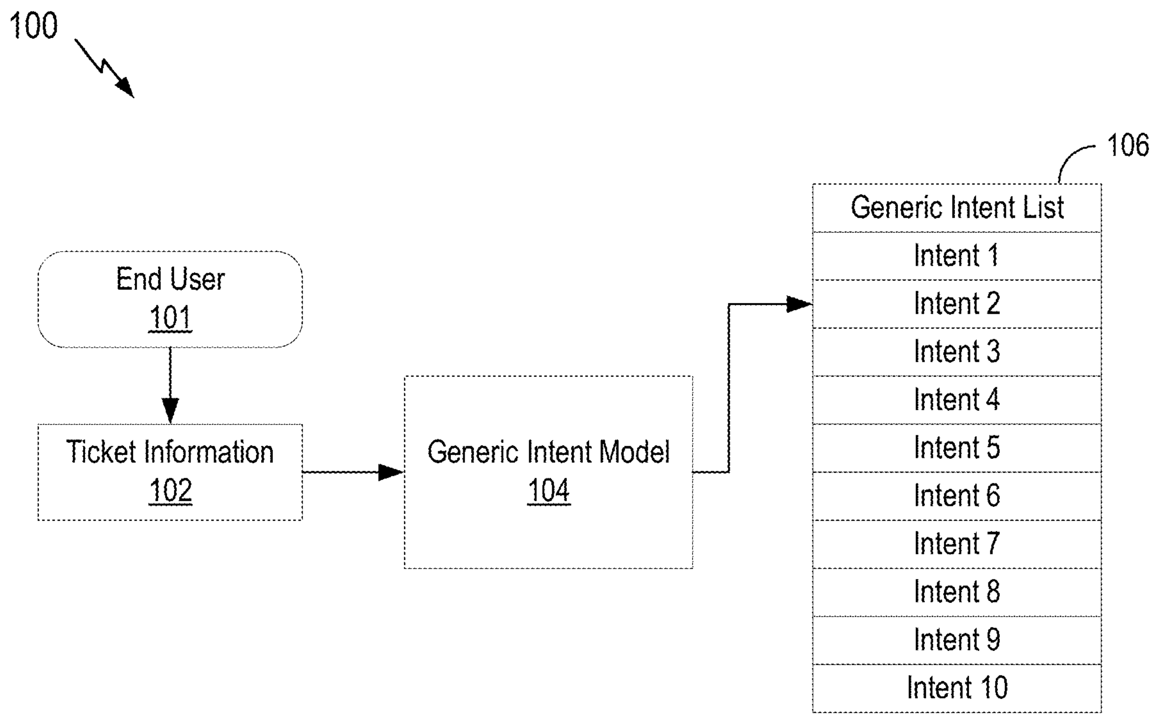
FIG. 1 depicts an example intent detection model architecture utilizing a generic intent model for predicting intents.

Aspects of the present disclosure provide apparatuses, methods, processing systems, and computer-readable mediums for performing intent detection using machine learning models. Intent detection may also be referred to as intent prediction.

In particular, aspects described herein combine the technical benefits of a generic (e.g., cross-domain) model with an intent masking mechanism that masks out irrelevant intents and allows (e.g., only allows) predictions of relevant intents for a given organization. Accordingly, the generic intent prediction models augmented with intent masking (referred to in short as masked intent models) described herein combine the best qualities of generic models and domain-specific models (e.g., organization-specific models) without the technical problems associated with each. For example, the masked intent models overcome the technical problem of training many domain-specific models and trying to precisely categorize organizations into domains associated with each model. Similarly, the masked intent models overcome the technical problem of predicting intents not relevant to a given organization as with conventional (e.g., non-masked) generic intent models. Implementing masked intent models thus engenders the beneficial technical effects of considerably reducing model training time, reducing model deployment time, and reducing model maintenance time, all in terms of physical resources (e.g., memory and power) and financial resources—all while maintaining the same intent prediction performance of domain-specific models and improving upon the intent prediction performance of generic models. Furthermore, intent detection or prediction described herein is useful for operation of end user support systems described herein, for example, by enabling setting up of views (e.g., on user interface) that organize support tickets into topics based on predicted intents and automatic preparation and sending of replies to certain support tickets associated with certain predicted intents.

In various embodiments described herein, a masked intent model is initially trained with supervision to predict an intent from a set of intents (e.g., classifications or labels) based on support ticket information (input data). The support ticket information may include, for example, ticket text as well as, optionally, information regarding the end user, the support ticket, the organization supporting the end user, and the industry (or industries) of the organization, to name a few options. Specific issues experienced by end users may be associated with abstractions called "support tickets," which encapsulate various data and metadata associated with end user requests to resolve an issue. An example support ticket may include, for example, a support ticket identifier and information (or links to information) associated with specific issue(s), as well as other information in various embodiments. The support ticket information can be converted to categorical features, numerical features, Boolean features, etc. The masked intent model may be based on various machine learning model architectures, such as a neural network model (e.g., a transformer model), a gradient boosted tree, or a combination thereof (e.g., an ensemble model).

The masked intent model is then modified to mask irrelevant intents by, for example, modifying the logit computation inside the model to give a suitably low probability (e.g., 0) to intents that are not relevant to an organization. For example, consider that there are four possible intents: [A, B, C, D] and the likelihood for a given support ticket before the masking is [0.5, 0.25, 0.25, 0]. Further consider that an organization mask related to the given support ticket is [A, C] (meaning that the organization only wants to see intents A or C). Then by performing the modification, the probabilities for the intents become [0.5, 0, 0.25, 0]. However, this probability array does not add up to 1, so it may be normalized to approximately [0.67, 0, 0.33, 0], which means that the model gives 67% probability of the support ticket being classified with the intent A and 33% probability of it being classified with the intent C. During training, this final array would be compared with the ground-truth array (e.g. [1, 0, 0, 0]) to compute the loss for the model.

Masking irrelevant intents may also be performed by filtering intents a posteriori based on a set of intents known to be relevant to the organization. For example, the masked intent model's prediction scores (e.g., probabilities or log-odds) for intents may be adjusted to mask intents not relevant to an organization. Regardless of the specific method of implementing the masking, the resulting masked intent model is technically improved in that it avoids predicting invalid intents for end users.

As a further enhancement, in some embodiments, the input to the masked intent model is augmented with a list of intents relevant to an organization. For example, the list of relevant intents can be input as a delimited list of relevant-intents, a binary array indicating which intents are relevant, or any other appropriate format. The relevant intents are then used by the masked intent model to map relevant intents as potential outputs for a support ticket associated with an end user (and an organization) in order to improve model performance (e.g., intent classification accuracy).

As yet another enhancement, in some embodiments, a set of intents relevant to an organization may be based on (at least in part) organization feedback regarding intents relevant to that organization, or even an end user's feedback to the organization. For example, an organization may suggest new intents to be added to the set of relevant intents and/or new intents may be automatically determined based on the organization's historical intent data.

Owing to both the dynamic nature of support service over time, and the desire to allow dynamic intent lists based on organizations' feedback, a list of intents relevant to an organization may change more frequently than new masked intent models are trained or updated. Accordingly, the masked intent models described herein may be trained to be robust to change and to maintain performance even as sets of relevant intents associated with organizations change. For example, in some embodiments, the masked intent models described herein are trained using dropout. Briefly, dropout is a training method in which random nodes are "dropped out" (e.g., omitted) during training in order to simulate a model (e.g., an ensemble) having a number of different network architectures. Beneficially, dropout is a computationally cheap and very effective regularization method that reduces overfitting and improves generalization for neural network-based models. Thus, dropout in this context helps prevent masked intent models from overfitting a training set with a particular set of relevant intents for an organization. Testing has shown a dropout of around 0.9 during training can improve the robustness of masked intent models to changes in relevant intents over time.

Further, the masked intent models described herein may be trained and tested with added noise, such as by including irrelevant intents in the input training data or removing relevant intents. Empirical evaluation has shown evidence that a noise ratio of 5-10% in the list of input intents can improve the robustness of masked intent models to changes in relevant intents over time.

In sum, embodiments described herein overcome technical problems in the art and create beneficial technical effects. For example, a single masked intent model may match or exceed the performance of domain-specific (e.g., industry-specific) models while reducing computational and financial resource usage (e.g., training time, deployment time, production resources, etc.). Further, embodiments described herein overcome the need to assign organizations to specific industries associated with specific models, which is a conventionally error-prone and resource-intensive task. Further, embodiments described herein are trained for personalization (e.g., by way of intent recommendations) and to be robust to change (e.g., changes in relevant intents over time), which reduces the frequency of model retraining and redeployment.

Example Intent Model Architectures

FIG. 1 depicts an example intent detection model architecture 100 utilizing a generic intent model 104 for predicting intents. In this example end user 101 provides support ticket information 102 (e.g., a description of a problem, need, or request), which is then provided to generic intent model 104. In this example, generic intent model 104 is trained to predict any intent in generic intent list 106, and in this example predicts "Intent 2" based on support ticket information 102.

Here, generic intent model 104 is configured to predict intents for any support ticket information, regardless of, for example, organization or industry for which end user 101 is providing support ticket information 102. As described above, this means that generic intent model 104 may predict an intent that is not relevant to end user 101, which may in turn cause delay in getting end user 101's support ticket information to the right support asset. For example, as depicted, the predicted "Intent 2" may not be an intent that is relevant to the organization associated with support ticket information 102 and end user 101. This may cause end user 101 to lose confidence in the organization providing the support, as well as the support personnel at the organization to lose confidence in the output of generic intent model 104.

The number of intents in generic intent list 106 is purely demonstrative, and any number of intents may be used. Moreover, while depicted as a list (e.g., generic intent list 106) for simplicity, intents may be stored and organized in any suitable fashion.

Figure 2:
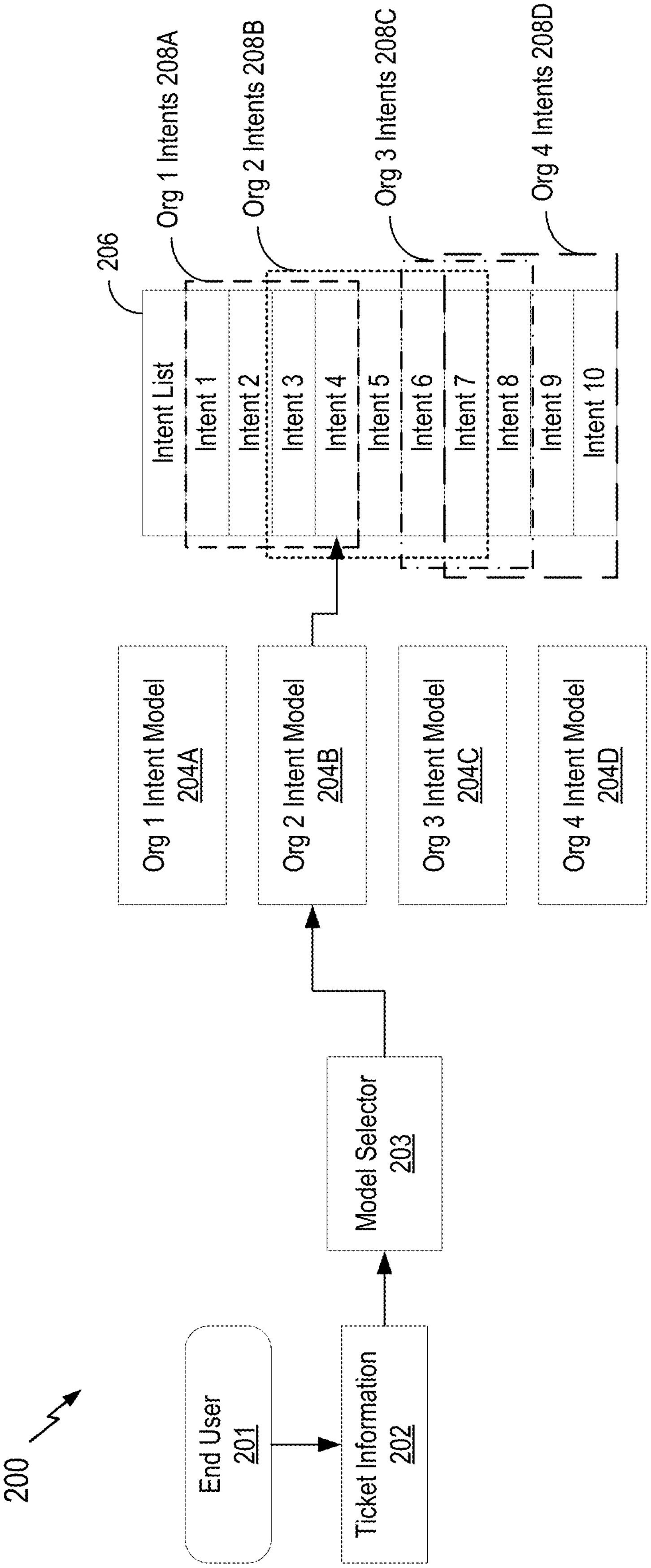
FIG. 2 depicts an example intent detection model architecture utilizing organization-specific intent models and a model selector.

FIG. 2 depicts an example intent detection model architecture 200 utilizing organization-specific intent models 204A-204D and model selector 203.

In this example, end user 201 provides support ticket information 202, which is then provided to model selector 203. Model selector 203 is configured to pick an organization-specific model (e.g., one of 204A-D) based on information related to end user 201, such as an organization providing goods and/or services to end user 201. In some embodiments, support ticket information 202 includes information necessary for model selector 203 to select the correct organization-specific intent model, such as an indication of the organization in a field or other data element of support ticket information 202. As depicted, organizations may have overlapping intents as well as exclusive intents compared to other organizations, such as depicted by organization intents 208A-D (e.g., organization intent subsets). In some cases, these may be kept in a database or similar.

In this example, model selector 203 selects intent model 204B, which is trained to predict intents 208B associated with organization 2. Further in this example, intent model 204B predicts "Intent 4" from intent list 206 based on support ticket information 202.

Here, each of intent models 204A-D is configured to predict intents associated with a specific organization. Thus, predicted intents may generally be more relevant, but at the expense of training, deploying, and maintaining the intent models 204A-D. As described above, maintaining a plurality of organization-specific intent models may require significant physical and financial resources.

The number of intents in intent list 206 and organization-specific models (here, 204A-D) are purely demonstrative, and any number of intents and models may be used. Moreover, while depicted as a list (e.g., intent list 206) for simplicity, intents may be stored and organized in any suitable fashion.

Figure 3:
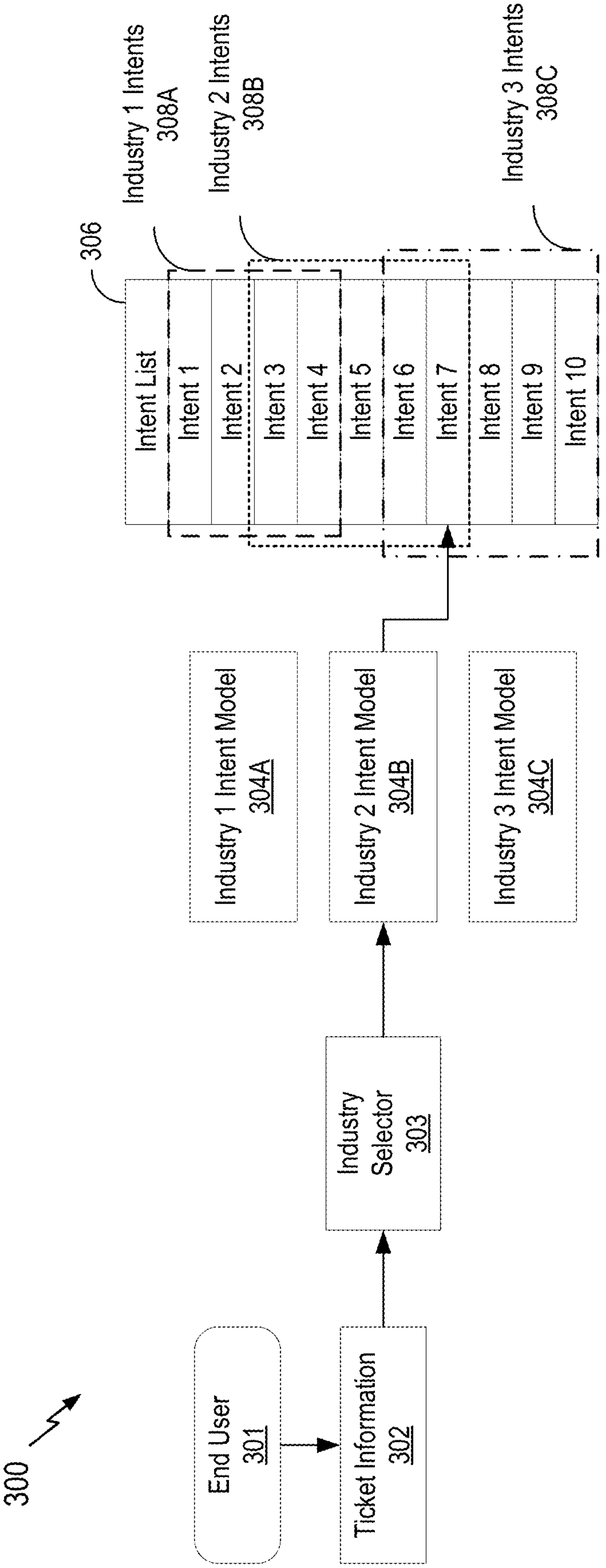
FIG. 3 depicts an example intent detection model architecture utilizing industry-specific intent models and a model selector.

FIG. 3 depicts an example intent detection model architecture 300 utilizing industry-specific intent models 304A-304C and model selector 303.

In this example, end user 301 provides support ticket information 302, which is then provided to model selector 303. Model selector 303 is configured to select an industry-specific model (e.g., one of 304A-C) based on information related to end user 301, such as an industry associated with an organization providing goods and/or services to end user 301. The association between organizations and industries may be maintained in a database, look-up table, or similar associative data structure. In some embodiments, support ticket information 302 includes information necessary for model selector 303 to select the correct industry-specific intent model, such as an indication of the organization that may be mapped to the industry via a lookup or query, or an indication of the industry directly.

In this example, model selector 303 selects intent model 304B, which is trained to predict intents 308B associated with industry 2, which in this case are intents 3-7 from intent list 306. As depicted, industries may have overlapping intents as well as exclusive intents compared to other industries, such as depicted by industry intents 308A-C (e.g., industry intent subsets). In some cases, these industry-specific intent lists may be kept in a database or similar. Further in this example, intent model 304B predicts "Intent 7" based on support ticket information 302. Various intents overlap between industries, as indicated by the various broken line boxes in FIG. 3.

Here, each of intent models 304A-C is configured to predict intents associated with a specific industry, which in turn may be associated with multiple organizations. Thus, predicted intents may generally be more relevant, but at the expense of training, deploying, and maintaining the intent models 304A-C. While there may be fewer industry models as compared to organizations (e.g., as in the example of FIG. 2), there are still multiple models to maintain. As described above, maintaining a plurality of industry-specific intent models may require significant physical and financial resources.

The number of intents in intent list 306 and industry-specific models (here, 304A-C) is purely demonstrative, and any number of intents and models may be used. Moreover, while depicted as a list (e.g., intent list 306) for simplicity, intents may be stored and organized in any suitable fashion.

Masked Intent Model Architecture

Figure 4:
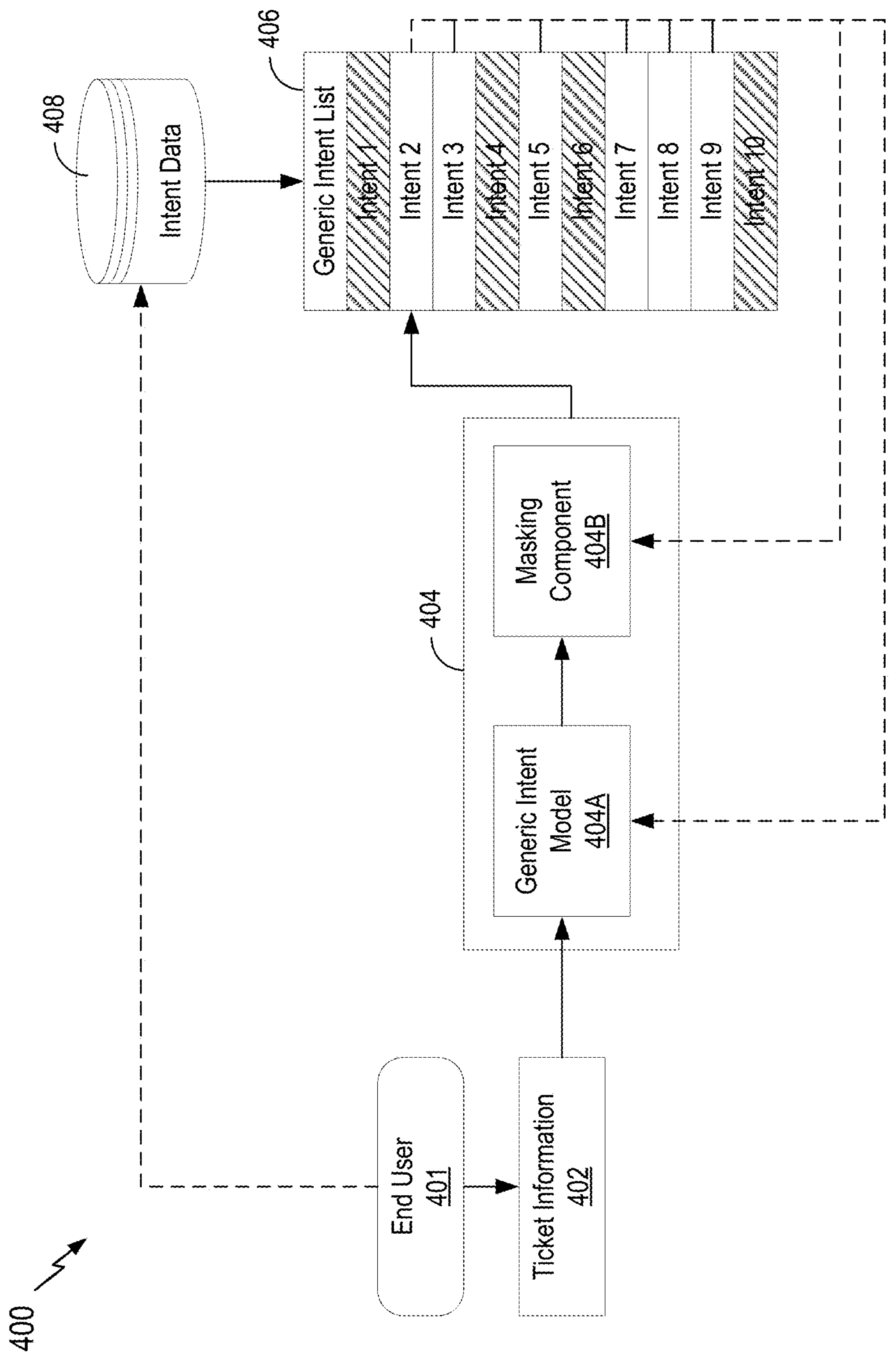
FIG. 4 depicts an example masked intent detection model architecture utilizing masked intent module.

FIG. 4 depicts an example masked intent detection model architecture 400 utilizing masked intent module 404. An intent detection model may also be referred to as an intent prediction model, intent model, or similar.

In this example, end user 401 provides support ticket information 402, which is then provided to masked intent module 404. In this example, masked intent module 404 includes a generic intent model 404A that is initially trained to predict any of the intents in generic intent list 406. Masked intent module 404 further includes a masking component 404B. While shown as a separate component for clarity, masking component 404B may be integral with generic intent model 404A (e.g., implemented by one or more layers or other processing components within generic intent model 404A). Further, even though referred to as generic intent model 404A owing to its capability to predict any of the possible intents, generic intent model 404A may likewise be referred to as a masked intent model because its possible outputs are masked (e.g., in this case by masking component 404B). In some embodiments, masked intent module 404 may be referred to alternatively as a masked intent model, masked intent architecture, or masked intent processing pipeline.

As discussed above, masking component 404B may be implemented in multiple ways. In one embodiment, masking component 404B represents a modified logit function. Generally, a logit function (also known as a log-odds function) is a function that represents probability values from 0 to 1, such as may be associated with different predictable intents in generic intent list 406. However, a modified logit function may be configured to set the probability of masked intents to zero such that they will never be predicted by generic intent model 404A, such as described above.

Masking component 404B may also be implemented as a post-logit function (e.g. a filtering function) that adjusts predicted values for masked intents such that they will not be output from masked intent module 404. In this case, by having a post-logit function, during training, the loss is calculated without using a filter. Consequently, the model predicts an intent out of all possible intents, and then the filter is applied, so that only one of the applicable intents is presented. Thus, with this approach, the generic model is not informed about the filtering mask, since the filter is done after the model provides the predictions.

In the depicted example, intents 1, 4, 6, and 10 are masked intents (e.g., intents that masked intent module 404 will not predict), which generally are intents not relevant to end user 401 for one reason or another. For example, the masked intents may not be relevant to end user 401 based on an industry or organization related to end user 401, or based on historical intent data associated with an organization related to end user 401 (e.g., saved in intent database 408). Further, intents 2, 3, 5, 7, 8, and 9 are unmasked intents that masked intent module 404 may predict. In some cases, the subset of unmasked intents may be preconfigured based on intent history and/or feedback from the organization related to end user 401.

In some cases, any number of the unmasked intents may be intents added by an organization or industry related to end user 401, after generic intent model 404A is trained. As described above, by training generic intent model 404A using certain technique(s), such as drop out and noise addition, generic intent model 404A will become more robust to changes in the generic intent list 406 over time. Further in this example, the masked intent module 404 predicts intent 2 in the generic intent list 406.

In some embodiments, the unmasked intents associated with the organization related to end user 401 (e.g., as may be stored in intent database 408) may optionally be provided as an additional input to generic intent model 404A and/or masking component 404B.

Intent detection model architecture 400 thus has the advantages of a single (generic) model implementation, such as described with respect to FIG. 1, while also having the prediction performance of a multi-model implementation, such as described with respect to FIGS. 2 and 3.

The number of intents in generic intent list 406 is purely demonstrative, and any number of intents may be used. Moreover, while depicted as a list (e.g., generic intent list 406) for simplicity, intents may be stored and organized in any suitable fashion.

Example Model Architecture for Masked Intent Model

Figure 5:
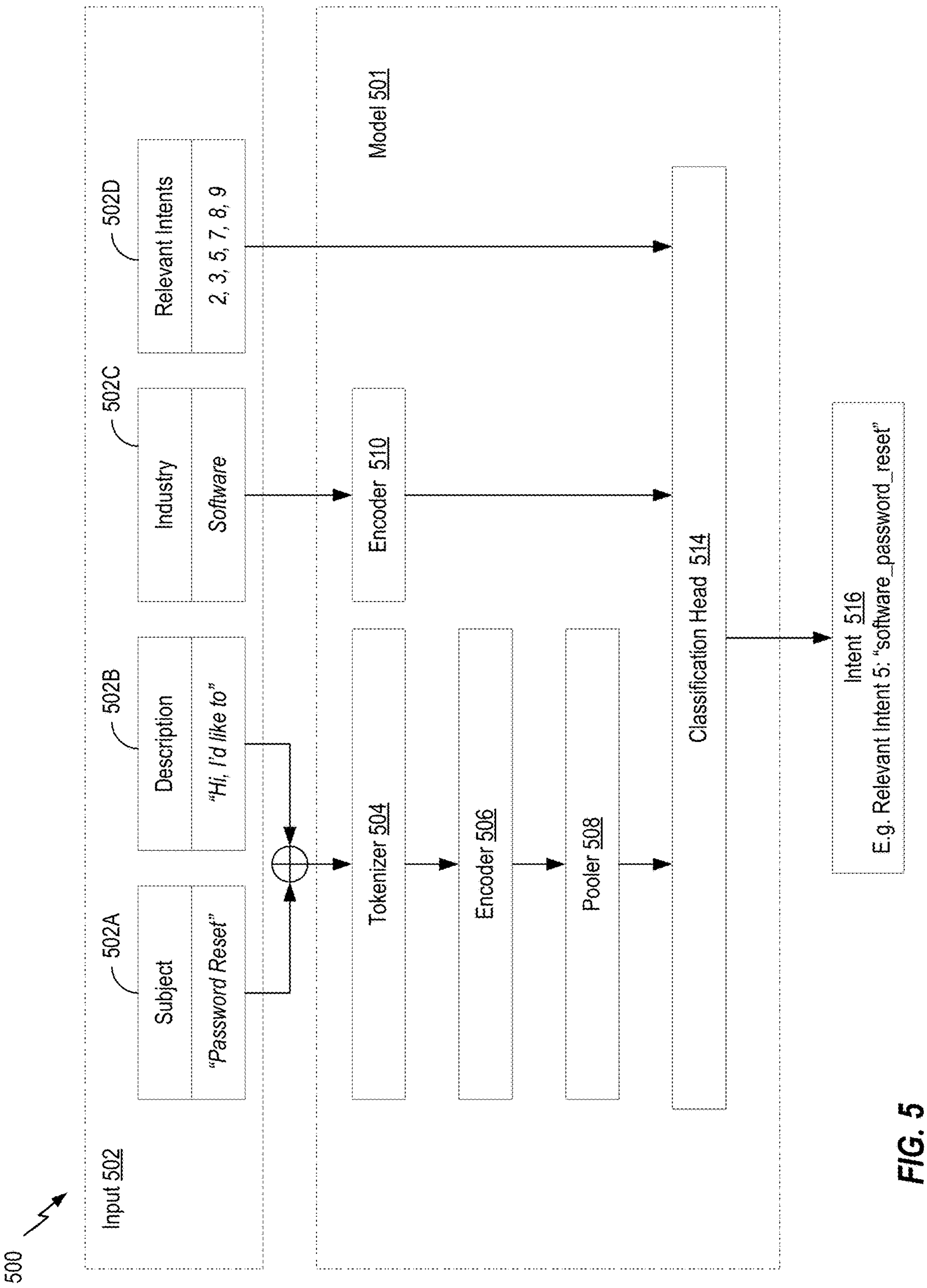
FIG. 5 depicts aspects of an example model architecture for a masked intent model.

FIG. 5 depicts aspects of an example model architecture 500 for a masked intent model 501. In one embodiment, masked intent model 501 is an example of generic intent model 404A described with respect to FIG. 4.

In this example, model architecture 500 is an example of a Bidirectional Encoder Representations from Transformers (BERT) model architecture. In other embodiments, other model architectures may be used.

Initially, input data 502 is provided to masked intent model 501. Generally, input data 502 may be numerical, categorical, textual, and/or other types of features related to, for example, support ticket information and an organization associated with the support ticket. In this example, the subject and description inputs 502A and 502B may be based on (e.g., extracted from) support ticket information provided to a support system. As described above, in some embodiments, additional support ticket information may be provided as inputs, such as industry information input 502C and/or relevant intents input (e.g., unmasked inputs) 502D. Inputs described herein with reference to input data 502 are just examples, and other sets of inputs can be used without departing from the spirit and scope of the present disclosure.

In this example, subject and description inputs 502A and 502B are combined (e.g., concatenated) and then provided to tokenizer 504, which is generally configured to convert text-based input into tokens that are more readily processed by aspects of masked intent model 501. The tokenized output from tokenizer 504 is then provided to encoder 506 for encoding, such as to an alternate (e.g., compressed or reshaped) representation. The encoded output from encoder 506 is then provided to pooler 508, which may perform various types of pooling operations, such as max or average pooling. The output of pooler 508 is finally provided to classification head 514. An example architecture for classification head 514 is described further with respect to FIG. 6.

As described above, in some cases, inputs other than support ticket information may be provided to masked intent model 501 to enhance model performance. In the example of FIG. 5, industry information input 502C is encoded (by encoder 510) and then provided as input to classification head 514. Ordinal encoding may be used to map labels to a single value for simplicity, such as "software" encoded as value '1' and "ecommerce" encoded as value '2', etc. In other words, not all input data needs tokenization or pooling when ordinal encoding of categorical data is used.

Additionally, relevant intents input (e.g., unmasked intents) 502D are provided to classification head 514.

Classification head 514 is configured to process its various inputs and output (e.g., predict) an intent 516 based on the input data 502.

FIG. 5 is one example of a model architecture, and other model architectures can be used. For example, a tree-based classifier, such a gradient boosted decision tree (e.g. XGBoost) model, may be used, as well as other types of models. In the case of a tree-based model, the mask information could be provided as Boolean features (e.g., with valid intents represented by value 1 and invalid intents represented as value 0).

Figure 6:
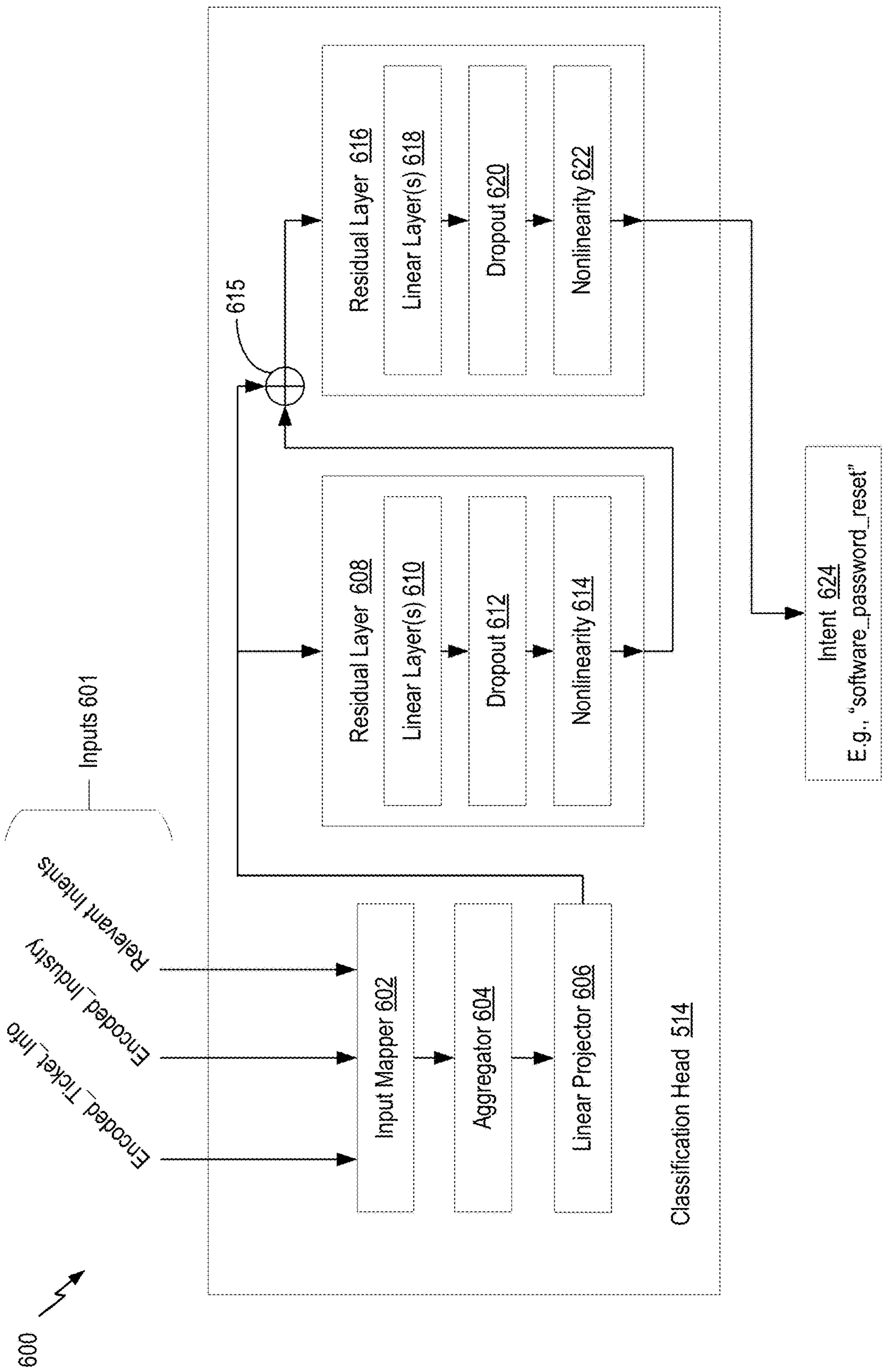
FIG. 6 depicts an example architecture for a classification head.

FIG. 6 depicts an example architecture 600 for a classification head, such as classification head 514 of FIG. 5.

Initially, a set of inputs 601 is provided to input mapper 602. Here, the set of inputs 601 include encoded support ticket information, encoded industry information, and relevant intent information, as discussed in relation to FIG. 5. In some implementations, encoded Customer Relationship Management (CRM) information may also be included in the set of inputs 601. In other implementations, different sets of inputs may be configured. Generally, the set of inputs 601 may be numerical, categorical, textual, and/or other types of features related to, for example, support ticket information and an organization associated with the support ticket.

Input mapper 602 is generally configured to transform all sources of the set of inputs 601 to the same "shape" (e.g., dimensionality). For example, for the encoded support ticket information, input mapper 602 performs (e.g., only performs) a linear projection. For categorical inputs, such as encoded industry information and encoded CRM information, input mapper 602 performs a linear projection, and also performs embedding dropout.

The output of input mapper 602 is provided to aggregator 604, which is generally configured to merge the multiple inputs in the set of inputs 601 into a single input. In some embodiments, this is performed using concatenation, though other methods, such as a mean-based method, may be used.

The output of aggregator 604 is provided to linear projector 606, which is generally configured to shape an output tensor for further processing by residual layer 608.

The output of linear projector 606 is provided to residual layer 608 (e.g., a first residual layer) for further processing. In this example, residual layer 608 includes one or more linear layers 610 (e.g., neural network layers) for processing the input to residual layer 608. The output of linear layer(s) 610 is provided to dropout component 612, which is configured to drop certain elements (e.g., nodes) of linear layer(s) 610 out before processing by nonlinearity component 614. The output of dropout component 612 is processed by nonlinearity component 614, which is generally a nonlinear function (sometimes also referred to as an activation function), such as tanh, sigmoid, ReLU, and others.

The output of residual layer 608 is added to the output of linear projector 606 (e.g., via a residual connection) at adder 615 and then provided to residual layer 616 for processing. Residual layer 616 includes one or more linear layer(s) 618, dropout component 620, and nonlinearity component 622, which operate the same as the like-named components of residual layer 608.

In this example, residual layer 616 is the last residual layer and thus its output is intent 624. However, in other examples, there may be any number of residual layers. Additionally, the features of each residual layer 608 and 616 are just one example, and other implementations of residual layers may include additional or alternative features.

FIG. 6 is one example of a classification head architecture, but other architectures can be used.

Example Methods of Predicting Intents

Figure 7:
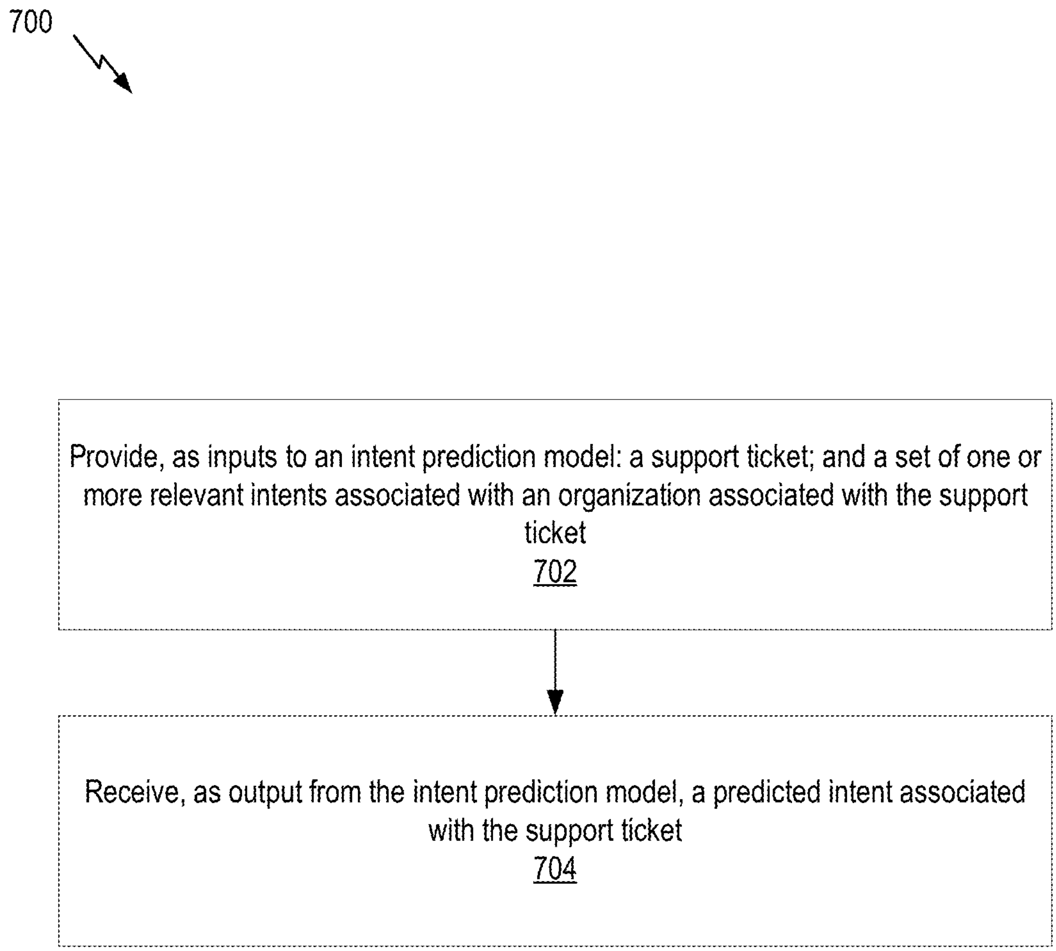
FIG. 7 depicts an example method of predicting one or more intents associated with a support ticket.

FIG. 7 depicts an example method 700 of predicting an intent associated with a support ticket.

Method 700 begins at step 702 with providing, as inputs to an intent prediction model (e.g., a masked intent model): a support ticket; and a set of one or more relevant intents associated with an organization associated with the support ticket. In some embodiments, the set of one or more relevant intents is a subset of a set of possible intents the masked intent model is configured to predict, such as described in the example of FIG. 4. In some embodiments, the masked intent model may be implemented as described with respect to FIGS. 5 and 6. Generally, "set" is meant to indicate any form of collection of data, such as a list, an array, a bag of words, etc.

Method 700 then proceeds to step 704 with receiving, as output from the masked intent model, one or more predicted intents associated with the support ticket. In some embodiments, the one or more predicted intents are in the set of one or more relevant intents associated with the organization.

In some embodiments of method 700, the masked intent model is configured to mask any possible intent in the set of possible intents other than the set of one or more relevant intents. For example, in some embodiments, the masked intent model is configured to mask any possible intent in the set of possible intents other than the set of one or more relevant intents by predicting a 0 probability associated with any possible intent in the set of possible intents other than the set of one or more relevant intents.

In some embodiments of method 700, receiving, as output from the masked intent model, the one or more predicted intents associated with the support ticket includes: receiving, as output from the masked intent model, one or more initial predicted intents associated with the support ticket; and adjusting a predicted probability to 0 of any initial predicted intent in the one or more initial predicted intents that is not in the set of one or more relevant intents associated with the organization. For example, adjusting may be performed by a masking component, such as described above with respect to FIG. 4.

In some embodiments, method 700 further includes receiving, from an organization, one or more additional predictable intents; and adding the one or more additional predictable intents to the set of one or more relevant intents associated with the organization, such as described above with respect to FIG. 4.

In some embodiments, method 700 further includes determining one or more additional predictable intents based on organization historical data; and adding the one or more additional predictable intents to the set of one or more relevant intents associated with the organization, such as described above with respect to FIG. 4.

FIG. 7 is just one example of a method of predicting an intent associated with a support ticket, and other methods including fewer, additional, or alternative steps are possible consistent with this disclosure.

Figure 8:
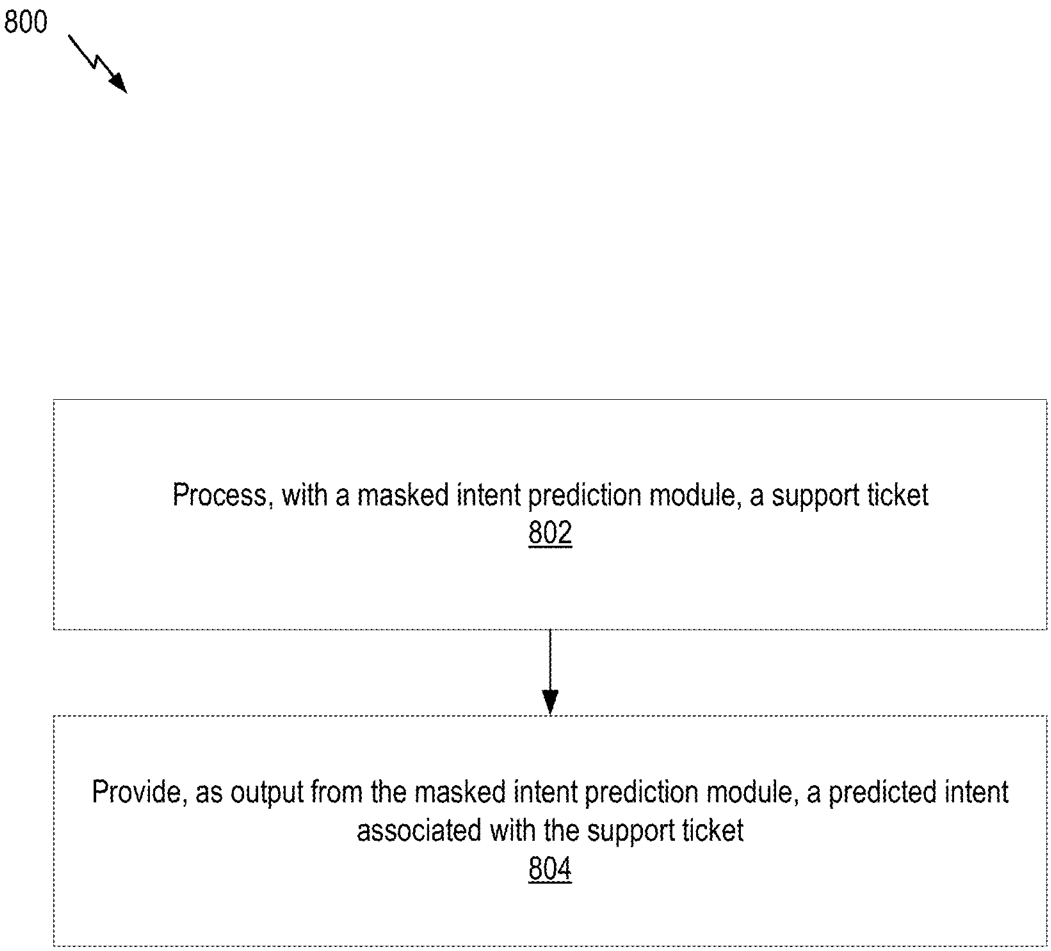
FIG. 8 depicts another example method of predicting one or more intents associated with a support ticket.

FIG. 8 depicts another example method 800 of predicting an intent associated with a support ticket.

Method 800 begins at step 802 with processing, with a masked intent module, the support ticket. In some embodiments, the masked intent module is configured to mask a subset of intents from a set of predictable intents and to predict (e.g., to only predict) unmasked intents from the set of predictable intents, as described above with respect to FIG. 4 and masked intent module 404. In some embodiments, the masked intent module may be implemented as described with respect to FIGS. 5 and 6.

Method 800 then proceeds to step 804 with providing, as output from the masked intent module, one or more predicted intents associated with the support ticket. In some embodiments, the one or more predicted intents are unmasked intents from the set of predictable intents, such as described above with respect to FIG. 4.

In some embodiments, method 800 further includes processing, with the masked intent module, a set of one or more unmasked intents associated with an organization.

In some embodiments of method 800, the masked intent module comprises an intent model. In some embodiments, the intent model is a generic intent model configured to predict any intent from the set of predictable intents, such as generic intent model 404A of FIG. 4.

In some embodiments of method 800, the intent model is configured to mask the subset of intents from the set of predictable intents. For example, in some embodiments, the masked intent module is configured to mask the subset of intents from the set of predictable intents by predicting a 0 probability associated with any intent in the subset of intents.

In some embodiments of method 800, the masked intent module further comprises a masking component, such as masking component 404B described above with respect to FIG. 4.

In some embodiments of method 800, processing, with the masked intent module, the support ticket, further includes receiving, as output from the intent model, one or more initial predicted intents associated with the support ticket; and adjusting a predicted probability to 0 of any initial predicted intent in the one or more initial predicted intents that is in the subset of intents.

Example Processing System

Figure 9:
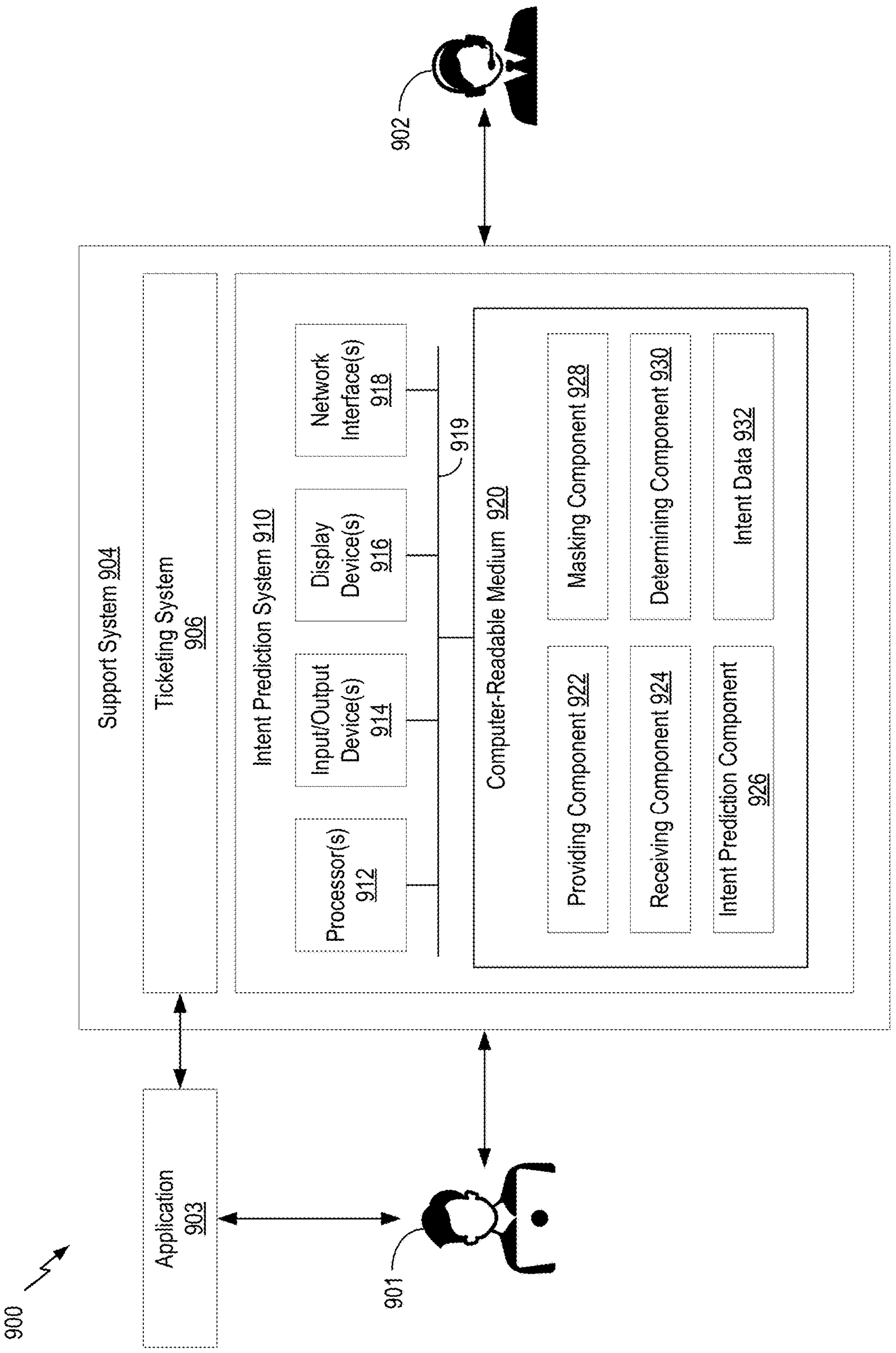
FIG. 9 depicts an example processing environment in which an intent detection system may be implemented.

FIG. 9 depicts an example processing environment 900 in which an intent detection system may be implemented.

Generally, one or more end users 901 interact with support system 904 through, for example, client computer systems. Support system 904, including ticketing system 906 and intent prediction system 910, may be provided by an organization, such as a commercial enterprise, to enable end user 901 to access support services in regards to a product or service offered by the organization, such as application 903. Generally, application 903 may be any sort of application, such as a web application, native application, mobile device application, smart device application, or the like.

If end user 901 has problems or questions about application 903, such as help using a feature of application 903, it can access support system 904 to obtain help addressing its problems and questions. In some cases, help may be provided by service agent 902, who interacts with end user 901 through support system 904. This help may also involve automatically suggested helpful articles that the end user 901 can read to try to resolve the problem or question. Service agent 902 may be able to access application 903 (either directly or indirectly through support system 904) to help resolve an issue.

In some embodiments, support system 904 is not associated with computer-based application 903, but is instead associated with another type of product or service that is offered to an end user. For example, support system 904 can provide assistance with a product, such as a television, or with a service, such as a package-delivery service.

Support system 904 organizes end user issues using a ticketing system 906, which generates support ticket(s) to represent each end user issue. Ticketing systems are typically associated with a physical or virtual “help center” (or “help desk”) for resolving end user problems. Ticketing system 906 may comprise a set of software resources that enable end user 901 to resolve an issue. As described herein, specific issues may be associated with abstractions called “support tickets,” which encapsulate various data and metadata associated with end user requests to resolve an issue. An example support ticket may include a support ticket identifier and information (or links to information) associated with a problem, as well as other information in various embodiments. For example, information regarding a problem may include: (1) information about the problem; (2) end user information for one or more end users who are affected by the problem; (3) agent information for one or more service agents who are interacting with the end user; (4) email and other electronic communications about the problem (which, for example, can include a question posed by an end user about the problem); (5) information about telephone calls associated with the problem; (6) timeline information associated with end user service interactions to resolve the problem, including response times and resolution times, such as a first reply time, a time to full resolution and a requester wait time; and (7) effort metrics, such as a number of communications or responses by an end user, a number of times a support ticket has been reopened, and a number of times the support ticket has been reassigned to a different service agent. Notably, these are just some examples, and others are possible.

In this example, support system 904 further includes intent prediction system 910, which may be configured to perform various methods as described herein, such as those described with respect to FIGS. 4, 7, and 8.

Intent prediction system 910 may be implemented in an electronic device configured to execute computer-executable instructions, such as those derived from compiled computer code, including for example desktop computers, tablet computers, server computers, cloud-based processing devices, and others.

In the depicted example, intent prediction system 910 includes one or more processors 912, one or more input/output devices 914, one or more display devices 916, one or more network interfaces 918 through which intent prediction system 910 is connected to one or more networks (e.g., a local network, an intranet, the Internet, or any other group of processing systems communicatively connected to each other), and computer-readable medium 920. In the depicted example, the aforementioned components are coupled by a bus 919, which may generally be configured for data exchange amongst the components. Bus 919 may be representative of multiple buses, while only one is depicted for simplicity.

Processor(s) 912 are generally configured to retrieve and execute instructions stored in one or more memories, including local memories like computer-readable medium 920, as well as remote memories and data stores. Similarly, processor(s) 912 are configured to store application data residing in local memories like computer-readable medium 920, as well as remote memories and data stores. More generally, bus 919 is configured to transmit programming instructions and application data among the processor(s) 912, display device(s) 916, network interface(s) 918, and/or computer-readable medium 920. In certain embodiments, processor(s) 912 are representative of one or more central processing units (CPUs), graphics processing units (GPUs), tensor processing units (TPUs), accelerators, and other processing devices.

Input/output device(s) 914 may include any device, mechanism, system, interactive display, and/or various other hardware and software components for communicating information between intent prediction system 910 and a user of intent prediction system 910, such as ticketing system 906 and/or service agent 902. For example, input/output device(s) 914 may include input hardware, such as a keyboard, touch screen, button, microphone, speaker, and/or other device for receiving inputs from the user and sending outputs to the user.

Display device(s) 916 may generally include any sort of device configured to display data, information, graphics, user interface elements, and the like to a user. For example, display device(s) 916 may include internal and external displays such as an internal display of a tablet computer or an external display for a server computer or a projector. Display device(s) 916 may further include displays for devices, such as augmented, virtual, and/or extended reality devices. In various embodiments, display device(s) 916 may be configured to display a graphical user interface.

Network interface(s) 918 provide intent prediction system 910 with access to external networks and thereby to external processing systems. Network interface(s) 918 can generally be any hardware and/or software capable of transmitting and/or receiving data via a wired or wireless network connection. Accordingly, network interface(s) 918 can include a communication transceiver for sending and/or receiving any wired and/or wireless communication.

Computer-readable medium 920 may be a volatile memory, such as a random access memory (RAM), or a nonvolatile memory, such as nonvolatile random access memory (NVRAM), or the like. In this example, computer-readable medium 920 includes providing component 922, receiving component 924, intent prediction component 926, masking component 928, determining component 930, and intent data 932.

In certain embodiments, providing component 922 is configured to perform functions, such as providing inputs to a masked intent model or module and providing outputs from the masked intent model or module.

In certain embodiments, receiving component 924 is configured to perform functions, such as receiving output from a masked intent model or module and receiving new predictable intents.

In certain embodiments, intent prediction component 926 is configured to perform intent prediction, such as via a masked intent model or module.

In certain embodiments, masking component 928 is configured to mask output from an intent model or mask predictable intents within the intent model.

In certain embodiments, determining component 930 is configured to determine new predictable intents based on historical data and/or organization feedback.

Intent data 932 may generally include historical data regarding intents relevant to an organization and/or industry. For example, intent data 932 may include organization intent data saved in intent database 408 described above with respect to FIG. 4.

FIG. 9 is just one example of a processing environment consistent with aspects described herein, and other processing systems having additional, alternative, or fewer components are possible consistent with this disclosure.

Example Clauses

Implementation examples are described in the following numbered clauses:

Clause 1: A method of predicting an intent associated with a support ticket, comprising: providing, as inputs to a masked intent model: the support ticket; and a set of one or more relevant intents associated with an organization associated with the support ticket, wherein the set of one or more relevant intents is a subset of a set of possible intents the masked intent model is configured to predict; and receiving, as output from the masked intent model, one or more predicted intents associated with the support ticket, wherein the one or more predicted intents are in the set of one or more relevant intents associated with the organization.

Clause 2: The method in accordance with clause 1, wherein the masked intent model is configured to mask any possible intent in the set of possible intents other than the set of one or more relevant intents.

Clause 3: The method in accordance with clause 2, wherein the masked intent model is configured to mask any possible intent in the set of possible intents other than the set of one or more relevant intents by predicting a 0 probability associated with any possible intent in the set of possible intents other than the set of one or more relevant intents.

Clause 4: The method in accordance with any one of clauses 1-3, wherein receiving, as output from the masked intent model, the one or more predicted intents associated with the support ticket comprises: receiving, as output from the masked intent model, one or more initial predicted intents associated with the support ticket; and adjusting a predicted probability to 0 of any initial predicted intent in the one or more initial predicted intents that is not in the set of one or more relevant intents associated with the organization.

Clause 5: The method in accordance with any one of clauses 1-4, further comprising: receiving, from the organization, one or more additional predictable intents; and adding the one or more additional predictable intents to the set of one or more relevant intents associated with the organization.

Clause 6: The method in accordance with any one of clauses 1-5, further comprising: determining one or more additional predictable intents based on historical intent data; and adding the one or more additional predictable intents to the set of one or more relevant intents associated with the organization.

Clause 7: A method of predicting an intent associated with a support ticket, comprising: processing, with a masked intent module, the support ticket, wherein the masked intent module is configured to mask a subset of intents from a set of predictable intents and to only predict unmasked intents from the set of predictable intents; and providing, as output from the masked intent module, one or more predicted intents associated with the support ticket, wherein the one or more predicted intents are one or more unmasked intents from the set of predictable intents.

Clause 8: The method in accordance with clause 7, further comprising processing, with the masked intent module, a set of one or more unmasked intents associated with an organization associated with the support ticket.

Clause 9: The method in accordance with any one of clauses 7-8, wherein the masked intent module comprises an intent model.

Clause 10: The method in accordance with clause 9, wherein the intent model is a generic intent model configured to predict any intent from the set of predictable intents.

Clause 11: The method in accordance with any one of clauses 9-10, wherein the intent model is configured to mask the subset of intents from the set of predictable intents.

Clause 12: The method in accordance with clause 11, wherein the masked intent module is configured to mask the subset of intents from the set of predictable intents by predicting a 0 probability associated with any intent in the subset of intents.

Clause 13: The method in accordance with any one of clauses 9-12, wherein the masked intent module comprises a masking component.

Clause 14: The method in accordance with clause 13, wherein processing, with the masked intent module, the support ticket, comprises: receiving, as output from the intent model; one or more initial predicted intents associated with the support ticket; and adjusting a predicted probability to 0 of any initial predicted intent in the one or more initial predicted intents that is in the subset of intents.

Clause 15: A processing system, comprising: one or more memories comprising computer-executable instructions; and one or more processors configured to execute the computer-executable instructions and cause the processing system to perform a method in accordance with any one of clauses 1-14.

Clause 16: A processing system, comprising means for performing a method in accordance with any one of clauses 1-14.

Clause 17: A non-transitory computer-readable medium storing program code for causing a processing system to perform the steps of any one of clauses 1-14.

Clause 18: A computer program product embodied on a computer-readable storage medium comprising code for performing a method in accordance with any one of clauses 1-14.

Clause 19: A processing system, comprising: one or more memories; and one or more processors, coupled to the one or more memories, configured to cause the processing system to perform a method in accordance with any one of clauses 1-14.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "a memory," "the processor," "the memory," etc.), unless otherwise specifically stated, should be understood to refer to one or more elements (e.g., "one or more processors," "one or more memories," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., a system) to perform functions, one element may be configured to cause the other element to perform all functions, or more than one element may collectively be configured to cause the other element to perform the functions. Unless specifically stated otherwise, the term "some" refers to one or more.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, “determining” may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) (logic) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean “one and only one” unless specifically so stated, but rather “one or more.” Unless specifically stated otherwise, the term “some” refers to one or more. No claim element is to be construed under the provisions of 35 U.S.C. § 112(f) unless the element is expressly recited using the phrase “means for” or, in the case of a method claim, the element is recited using the phrase “step for.” All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums corresponding to performing intent detection using machine learning models. It should also be understood that these embodiments are merely exemplary and are not intended to limit the scope of this disclosure.

What is claimed is:

1. A method of predicting an intent associated with a support ticket, comprising:

processing, with a masked intent model, the support ticket, wherein:

the masked intent model comprises a modified logit function and a classification head, and processing the support ticket with the masked intent model comprises:

masking a subset of intents from a set of predictable intents by setting, based on the modified logit function, a probability of at least one intent of the subset of intents to a probability value such that the at least one intent is never predicted, wherein the at least one intent comprises an invalid intent for an organization;

providing, as input to the classification head, an encoding of the support ticket and a second subset of intents of the set of predictable intents, the second subset of intents comprising one or more unmasked intents from the set of predictable intents;

processing the encoding of the support ticket and the second subset of intents with at least one of an input mapper, configured to transform the encoding of the support ticket and the second subset of intents into the same dimensionalities, or a residual layer of the masked intent model;

performing a dropout that drops at least one element of the residual layer to prevent the masked intent model from being overfitted with a portion of the set of predictable intents; and obtaining, as output from the classification head, at least one unmasked intent from the second subset of intents; and providing, as output from the masked intent model, one or more predicted intents associated with the support ticket, wherein the one or more predicted intents comprise the at least one unmasked intent from the second subset of intents.

2. The method of claim 1, further comprising processing, with the masked intent model, a set of one or more unmasked intents associated with the organization.

3. The method of claim 1, wherein the masked intent model comprises a generic intent model configured to predict any intent from the set of predictable intents.

4. The method of claim 1, wherein the masked intent model is configured to mask the subset of intents from the set of predictable intents by predicting a 0 probability associated with any intent in the subset of intents.

5. The method of claim 1, wherein the masked intent model comprises a masking component.

6. The method of claim 5, wherein processing, with the masked intent model, the support ticket, comprises:

obtaining one or more initial predicted intents associated with the support ticket; and adjusting a predicted probability to 0 of any initial predicted intent in the one or more initial predicted intents that is in the subset of intents.

7. The method of claim 1, further comprising:

receiving one or more additional predictable intents; and adding the one or more additional predictable intents to the set of predictable intents.

8. The method of claim 1, further comprising:

determining one or more additional predictable intents based on historical intent data; and adding the one or more additional predictable intents to the set of predictable intents.

9. The method of claim 1, wherein the one or more unmasked intents belong to a preconfigured subset of intents of the set of predictable intents that is preconfigured based on historical intent data.

10. The method of claim 1, wherein the one or more unmasked intents belong to a preconfigured subset of intents of the set of predictable intents that is preconfigured based on a-feedback related to the organization.

11. The method of claim 1, wherein one or more intents of the one or more unmasked intents are provided by the organization related to an end user of the masked intent model.

12. The method of claim 1, wherein processing the support ticket with the masked intent model comprises processing, with the masked intent model, the support ticket and one or more intents of the one or more unmasked intents as input to the masked intent model.

13. The method of claim 1, wherein processing the support ticket with the masked intent model comprises processing, with the masked intent model, a subject of the support ticket and a description of the support ticket, as input to the masked intent model, wherein the input comprises a concatenation of the subject of the support ticket and the description of the support ticket.

14. The method of claim 1, wherein processing the support ticket with the masked intent model comprises processing, with the masked intent model, at least one of a subject of the support ticket, a description of the support ticket, an industry of the support ticket, or one or more intents of the one or more unmasked intents, as input to the masked intent model.

15. The method of claim 14, further comprising extracting, from the support ticket, at least one of the subject of the support ticket or the description of the support ticket.

* * * * *